United States Patent [19]

Leroux

[11] Patent Number: 4,669,634
[45] Date of Patent: Jun. 2, 1987

[54] APPARATUS AND PROCESS FOR THE METERING OF PREDETERMINED QUANTITIES OF AT LEAST ONE PRODUCT

[75] Inventor: Hugues Leroux, Montreuil, France

[73] Assignee: Roussel Uclaf, Romainville, France

[21] Appl. No.: 404,816

[22] Filed: Aug. 3, 1982

[30] Foreign Application Priority Data

Aug. 4, 1981 [FR] France ............................ 81 15094

[51] Int. Cl.$^4$ ............................................ G01G 11/08
[52] U.S. Cl. .................................... 222/53; 222/58; 222/77; 222/161; 222/203; 177/50; 177/70; 177/114
[58] Field of Search ................ 222/77, 202, 203, 148, 222/52, 55, 56, 58, 71, 53, 152, 160, 161; 177/50, 70, 114

[56] References Cited

U.S. PATENT DOCUMENTS

| | | | |
|---|---|---|---|
| 2,381,802 | 8/1945 | Booth et al. | 222/203 X |
| 3,150,798 | 9/1964 | Sutton | 222/77 X |
| 3,308,898 | 3/1967 | Allen et al. | 222/77 X |
| 3,319,828 | 5/1967 | Maxwell | 222/58 X |
| 3,363,806 | 1/1968 | Blakeslee et al. | 222/202 X |
| 3,618,684 | 11/1971 | Burke et al. | 222/58 X |
| 3,654,970 | 4/1972 | Teboul | 222/77 X |
| 3,889,848 | 6/1975 | Ricciardi et al. | 222/58 |
| 3,953,077 | 4/1976 | Kulyabko et al. | 222/56 X |
| 4,095,723 | 6/1978 | Lerner | 222/56 |
| 4,111,272 | 9/1978 | Ricciardi et al. | 222/71 X |
| 4,180,185 | 12/1979 | Yamamoto et al. | 222/77 X |
| 4,381,067 | 4/1983 | Catelli | 222/152 X |
| 4,402,428 | 9/1983 | Lang et al. | 222/58 |

FOREIGN PATENT DOCUMENTS

| | | |
|---|---|---|
| 2450450 | 4/1976 | Fed. Rep. of Germany . |
| 2448031 | 4/1976 | Fed. Rep. of Germany . |
| 2846633 | 5/1980 | Fed. Rep. of Germany ........ 222/56 |
| 2949298 | 5/1981 | Fed. Rep. of Germany . |
| 2356129 | 5/1976 | France . |
| 2341844 | 2/1977 | France . |

Primary Examiner—Joseph J. Rolla
Attorney, Agent, or Firm—Bacon & Thomas

[57] ABSTRACT

An apparatus and process for the metering of predetermined quantities of at least one product to be delivered to at least one mobile receiver by means of a distribution station which comprises means effecting the discharge of a product from a container, a device effecting simultaneously the preliminary storage, homogeneization and the transfer of the product to a weighing assembly comprising a metering feeder equipped with means to deliver the product to a mobile receiver, means to effect static weighings and dynamic weighings, means to conduct automatically the operations of weighing and the delivery of the product to the mobile receiver, means to effect the transfer of the product to the mobile receiver and to obturate the outlet of the weighing assembly, and the elements of the distributor station are further equipped with means to create and to maintain the impermeability of the apparatus with respect to the product involved and the elements of the environment.

8 Claims, 1 Drawing Figure

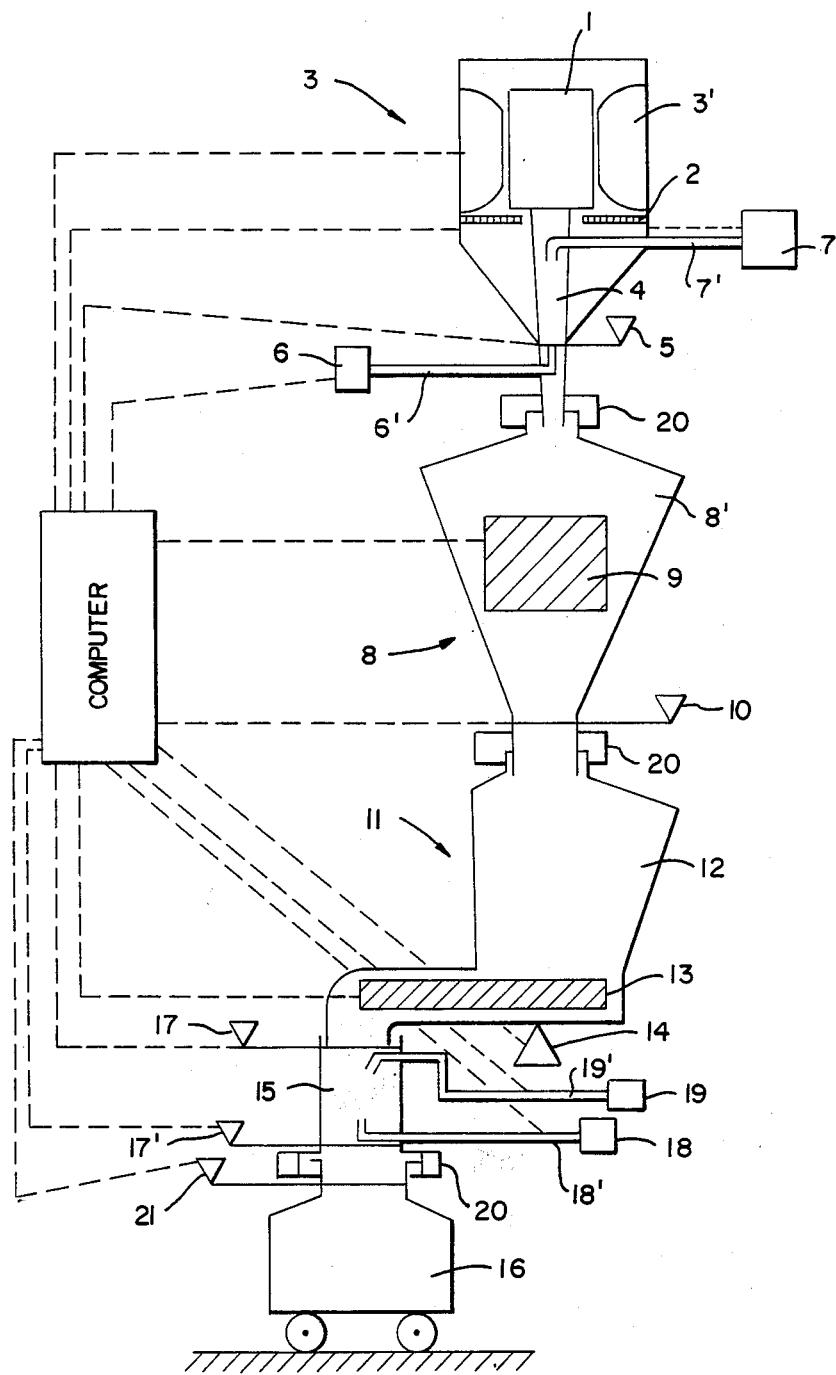

APPARATUS AND PROCESS FOR THE METERING OF PREDETERMINED QUANTITIES OF AT LEAST ONE PRODUCT

The present invention concerns an apparatus and process effecting the metering of predetermined quantities of at least one product.

More particularly, the object of the invention is an apparatus and a process insuring a high degree of accuracy under conditions of strict impermeability of the metering circuit with respect to the products involved, the elements of the environment and the avoidance of mutual contamination.

Devices and processes effecting the metering of products during the preparation of different mixtures or assortments or the assembly of different pieces are already known. Most of them effect the controls by weighing the quantities of the products or pieces to be mixed or assembled. These devices and processes may be partially automated.

The control operations are effected at rest or in motion, often at a very high velocity.

Devices and processes are further known whereby the desired metering of the components of a mixture or an assortment is obtained by comparing the values of the weights of the components with the theoretical values of the weights of the components and by adjusting them if necessary by the addition or removal of components.

These types of devices and processes are frequently used in industry, particularly in combination with mobile receivers or conveyor belts capable of receiving the components intended for a mixture or an assortment. Controls may be actuated, for example, by means of conventional devices, at rest or in motion, each time a quantity of a component has been delivered to form a mixture or an assortment. The total weight is then verified and corrections made, if necessary. Mixtures may also be weighed only after the components are added.

Nevertheless, in the majority of these cases the accuracy of the metering obtained is not very high because the mixtures of assortments involved permit a comfortable degree of tolerance.

Devices and processes of this type are found for example in the food industry, such as bakeries, in the preparation of assortments of different goods or the preparation of mixtures for the dough or batter, in the synthetic materials industry, in construction related industries, in metallurgy or the chemical industry.

As mentioned hereinabove, the quantities of the product to be metered are allowed more or less comfortable tolerances as a function of the product to be measured.

Furthermore, the nature of the products to be metered in general do not present particular problems of contamination of the workplace or mutual contamination of the different compounds treated. The usual measures of precaution and hygiene in effect in the industries in question are adequate.

The present invention successfully insures by the application of its apparatus and process, the metering of predetermined quantities of products with a very high degree of accuracy and the maintenance of conditions assuring the strict impermeability of the system (transfer circuit) with respect to the products involved, the elements of the environment and the avoidance of mutual contamination (i.e., the components to be used in the mixture, the elements of the system, and the surrounding environment are not contaminated). By virtue of this fact, the apparatus and process of the invention may be used whenever such conditions are required. This applies in particular to the pharmaceutical industry.

The accuracy of the metering of medicinal mixtures is of vital importance in this industry, because these mixtures may contain products which are harmful in certain doses. Furthermore, possible contamination of workers or workplaces by these products, together with the mutual contamination of the products intended to be added to the medicinal mixtures at a specific time present an additional risk. By means of the present invention, these risks may be reduced to a minimum.

In the pharmaceutical industry it is necessary, for example, to prepare mixtures of medicines, certain components of which are expensive and further which may be present in a strictly regulated dose. It is therefore imperative that the quantity of each component be strictly controlled so that it corresponds to the value initially set. This control must be effected for each product prior to the addition of new component to complete the mixture in question. If a different procedure is followed, for example by ascertaining only the final weight of a mixture once the addition of the different components is completed, the quantities of each of the components present in the final mixture may in fact not be those initially specified.

The present invention makes it possible to attain highly accurate metering of predetermined quantities of products while avoiding contamination of the metered product. The apparatus and metering process of the invention subjects each quantity of each component of the mixture to four successive weighing procedures prior to the acceptance of a new component by the mobile receiver. In this manner, it may be ascertained with precision and with respect to each component, whether the specified quantity to be added has been strictly observed.

Concerning the abovementioned problems of contamination, they are resolved by the development of a circuit rendered impermeable both with respect to the product or products involved and the elements of the environment.

In the description hereinafter, when the terms "dynamic weight" and "static weight" are used, these terms refer to weights which are determined during the operation of the apparatus which is the object of the invention and the execution of the metering process which is also the object of the invention.

The term dynamic weight is intended to signify weights established in the course of the transfer of the product to be metered, i.e., in the course of the movement of the product to be metered from a device of preliminary storage to the weighing assembly and in the course of the transfer of said product from the weighing assembly to the mobile receiver. In both cases, once the specified quantity of the product is transferred, the means effecting the weighing simultaneously causes the transfers to cease.

The term static weight signifies weights determined in the absence of transfer of the product to be metered, i.e., while the means effecting said transfers are stationary.

The FIGURE is a schematic representation of the apparatus depicting, vertically, means for emptying and conveying the contents of a container into a storage and mixing chamber which is connected to a weighing station capable of receiving a product from the mixing chamber. The product is both statically and dynamically weighed in the weighing station and transferred via a conduit to a mobile receiver which receives the statically and dynamically weighed and metered product.

The apparatus that is the object of the invention effects the metering of predetermined quantities of at least one product to be delivered to at least one mobile receiver. The apparatus comprises at least one distribution station of the product to be metered wherein the apparatus comprises:

I—Means (3) to insure the emptying of the container containing the product to be metered;

II—A device (8) effecting simultaneously the preliminary storage, homogenization if desired and the transfer of the product to be metered to a weighing assembly (11);

III—A weighing assembly (11) consisting of:
 (a) A metering feeder (12) equipped with means (13) to deliver the product, such as a metering extractor, to be metered to a mobile receiver,
 (b) Means (14) to effect static weighing and dynamic weighing,
 (c) Means for the automatic performance of the operations of weighing and delivery of the metered product to the mobile receiver (16),
 (d) Conduit means (15) to enable the transfer of the metered product to the mobile receive (16) and to close the outlet of the weighing assembly (11);

IV—The principal elements of the distributor station are connected together with means (20) to create and to maintain the impermeability of the circuit with respect to the product involved and the elements of the environment;

V—The entirety or part of the operation of the elements of the distribution station may be automatic; and VI—Means are further provided to make possible the cleaning of the elements of the assembly as desired in order to eliminate any remaining particles of the product to be metered still present n the elements of the distribution station after the metering of the product.

The various elements forming the apparatus are known to the art and do not per se form part of the invention. For example, the container (1) holding the product can be inserted into a vibrator (3'). Base (2) supports container (1) between the vibrator. The vibrator (3') vibrates the walls of the container (1). Alternatively, (3') can be a pneumatic apparatus cooperating with a deformable wall of the contaner to cause deformation of the container wall and to facilitate transfer of the product in the container through the discharge conduit (4).

The discharge conduit (4) is connected to the opening of container (1). The joint and connection are rendered tight by a strap or other fastening means. The other end of the conduit isconnected to the inlet of the stoppered storage feeder (8') by means of a strap or similar fastening means. Conduit (4) enables the transfer of product from the container (1) to the stoppered feeder (8') without contamination from the surrounding environment because of the tight connection. The discharge conduit (4) can be further equipped with a separating valve (5). When this valve is closed, it prevents the transfer of product from container (1) to the stoppered feeder (8').

In order to facilitate the discharge of the container (1) and the transfer of the product to be metered into the stoppered feeder (8'), the discharge conduit (4) is connected by means of a valve or gate (not shown) to a vacuum device (6) through conduit (6'), which thereby produces an aspiration effect in conduit (4), and also by means of a valve or gate to a blower (7) through conduit (7'), which utilizes a gas such as air or an inert gas, chosen as a function of the chemical and physical properties of the product to be metered, to clean conduit (4) of the particles of the metered product.

The elements just described as well as the entire apparatus and process may be operated manually. However, it is preferred that these operations be performed electromechanically by means of a computer. A computer is shown in the figure and is connected to the various elements of the apparatus. The computer may be programmed to insure either complete automation or partial automation of the process. The program to activate and deactivate electromechanical devices in response to electrical signals is well known and does not, per se, form part of this invention.

For example, the computer can actuate the vibrator (3'), which vibrations facilitate the flow of the product contained in container (1) into stoppered feeder (8') due to gravity. Blower (7) may be then activated and valve (5) opened to permit complete transfer of the product. Alternatively, a predetermined weight could be programmed into the computer and the vibration stopped and valve (5) closed in response to a signal from a weighing means, such as weighing means (14) when the weighing means detected the arrival of the predetermined amount of product. After completion of the transfer, blower (7) and vacuum means (6) can be activated to further clear conduit (4) before another transfer.

Device (8) is a schematic representation of a device for effecting simultaneously the preliminary storage, homogenization, if desired, and the transfer of the product to be metered to a weighing assembly (11). More specifically, device (8) may be stoppered feeder (8'), which is equipped with a conventional device (not shown) capable of washing its interior by means of, for example, a jet of cold or hot water. Since the stoppered feeder (8') is washed by a jet of cold or hot water, it is obvious that during the washing, the stoppered feeder (8') must be disconnected from the discharge conduit (4) and the weighing assembly (11). Coupling devices (20) are uncoupled and device (8') washed to remove contaminants when necessary.

The device (8') is also equipped with means (9) to homogenize the product, and extract it, thus eliminating the danger of the adherence of the product to the walls of the outlet conduit of the stoppered feeder (8'). The means (9) may be an extractor in the form of an endless screw, with the actuation and deactivation of the screw being controlled automatically by the computer responding to the values measured at the weighing station (14). For example, when the weighing assembly (11) has received the desired load of the product to be metered, a signal is sent to the computer which is programmed to send a stop signal to the screw which stops delivery of the product.

The outlet of the stoppered feeder (8') is connected to metering feeder (12) via coupling means (20) to secure a connection between the stoppered feeder (8') and the metering feeder (12). This coupling is conventional and prevents any contamination from the surroundings to enter the apparatus. The outlet of the stoppered feeder (8') is equipped with a gate (10) controlling the opening and closing of the outlet by means of a valve. When the transfer of the product to be metered from the stoppered feeder (8') to the weighing assembly (11) is started, the gate (10) and valve are open. The start of the metering and opening of the valve are controlled automatically by computer. Once the transfer is complete, the valve is closed between the stoppered feeder (8') and the weighing assembly (11) in response to a signal which is sent to the computer from the means effecting the weighings (14).

The inlet of the weighing assembly (11) is coupled to the outlet of the stoppered feeder (8') by coupling means (20). The weighing assembly (11) consists of:

(a) A metering feeder (12) equipped with means (13) such as a metering extractor, to deliver the product to be metered to the mobile receiver. The metering extractor (13) of the metering feeder (12) is shown schematically in the figure as an endless screw located in the lower part of the feeder. Actuation of the screw is controlled automatically by the computer. Deactivation of the screw is effected by the computer in response to a signal from the means performing the weighing (14), when a desired quantity of the product has left the metering feeder (12); and (b) Means (14) to effect static weighing and dynamic weighing of the metered product is a balance operating simultaneously in the load lightening and load increasing mode and further being capable of effecting static weighings.

The outlet of the metering feeder (12) is connected to the inlet of mobile receiver (16) by conduit (15). Conduit (15) is a tight joining device connecting the weighing assembly (11) and mobile receiver (16). The joining means (conduit) is equipped with two butterfly valves (17) and (17') (placed at the inlet and outlet, respectively, of the joining device) to enable one of its ends to be coupled hermetically with the outlet of the weighing means (11) and the other end to be coupled with the opening of the mobile receiver (16) by coupling means (20). The joining means (15) can be further connected with an aspiration device (18) and a blower device (19). Butterfly valves (17) and (17') are connected to the computer and may be opened and closed in response to a signal from the computer.

To facilitate the transfer of the metered product to the mobile receiver (16), a vacuum is created in the joining device (15) connecting the weighing assembly (11) with the mobile receiver (16), when the butterfly valve (17') of the outlet of the joining device (15) is open and the butterfly valve (17) in its inlet is closed. This vacuum is created by vacuum device (18) connected to joining device (15) through conduit (18'). By virtue of this vacuum, an effect of aspiration of the particles of the metered product present in the joining device (15) is produced.

In order to clean the joining device (15), when the quantity desired of the product to be metered is transferred into mobile receiver (16) and the device creating the aspiration effect is closed off, air or an inert gas is blown into the joining device (15), to remove the particles of the product still remaining therein through conduit (19') by blower (18).

Once the metering and the cleaning are completed, the following are actuated automatically by the computer:

(a) Butterfly valve (17') of the outlet of the joining device (15) is closed and butterfly valve (21) is opened;

(b) The moble receiver (16) is separated from the joining device (15) by uncoupling coupling means (20); and (c) The mobile receiver (16) is displaced to another distributor station or, in the case of where all of the components of a mixture have already been added, to the installations effecting the next stage of manufacture.

The elements of the distributor station are connected to create and to maintain the impermeability of the circuit with respect to the product involved and the elements of the environment to a level of contamination of the environment which does not exceed 350 particles of the product or products treated, per liter of the ambient air, or 10,000 particles per cubic foot of the ambient air.

The weighing assembly (11) is preferably insulated to insure thermal stability excluding temperature deviations greater than 2° C. with respect to the desired temperature, and to insure a relative humidity of 50%±5%. The weighing assembly ia mounted so as to avoid parasite vibrations.

Two or more weighing assemblies may be used simultaneously when it is desired to meter two or more different products, which should remain independent of each other while in the weighing assembly stage of the process.

It is obvious that all of the elements of the apparatus that is the object of the invention, entering into contact with the products to be metered, must be made of materials that are chemically inert with respect to these products. Such materials are well known and include stainless steels, synthetic plastic materials, such as teflon, and plastic materials which are used for food products.

The process, also an object of the invention, for the metering of predetermined quantities of at least one product to be delivered to at least one mobile receiver (16), comprises the following steps:

(a) The product to be metered is discharged into a stoppered metering device (8') (under vacuum, if desired), by simultaneously applying pressure to the wall of the container (1), which may be deformable, in which the product is contained, by means of a pneumatic device, or by exposing a container (1) with non-deformable walls to vibrations or shaking, by means of a vibrator. The discharge of a container (1) is effected rapidly, in approximately 5 to 7 minutes, for a container holding approximately 200 kg of the product.

(b) The product is homogenized, if desired, by means (9), which is used to homogenize and transfer the product to be metered, and must simultaneously eliminate the risk of the adhesion of the product to be metered to the walls of the stoppered feeder (8'). For example, the homogenizer can be self-contained within the stoppered feeder (8') as schematically represented in the figure, i.e. element (9). These means may also be in the form of a malaxator, a helice or a vibrator. The product is transferred to a weighing assembly (11) in the following manner:

(1) The product is introduced into the weighing assembly until a first weight, designated the dynamic weight (I), is detected by the weighing means. This weight indicates that the desired quantity of the product has been introduced into the weighing assembly (11). The dynamic weight (I) causes the introduction of the product to be discontinued via the computer;

(2) The effective quantity of the product present in the weighing assembly (11) is ascertained by means of a second weighing, designated the static weight (II);

(3) The product is discharged from the weighing assembly (11) following the opening of the butterfly valve (17) of the inlet of the joining device (15) until a third weighing, designated the dynamic weight (III), detects that the desired quantity has left the weighing assembly (11), whereupon the dynamic weight (III) causes the delivery of the product to be discontinued via the computer;

(4) A fourth weighing is effected, designated the static weight (IV), of the product still contained in the weighing assembly (11) after the joining device has been cleaned and the butterfly valve (17') of the outlet of the joining device (15) is closed;

(5) The metering of the desired quantity of the product from the weighing assembly (11) is ascertained, in order to transport it to the mobile receiver (16), by comparing the two static weights, i.e., the second static weight (II) and the fourth static weight (IV). The discontinuation of the transfer of the product to be metered to the mobile receiver (16) is controlled by the means effecting the weighings (14), via the computer, when the computer has determined by the weighing that the predetermined quantity of the product has left the weighing assembly (11); and (6) If necessary, the weight is augmented to the specified weight by causing the weighing assembly (11) to transfer to the mobile receiver (16) the quantity of the product necessary to equal the dose of the product initially specified.

(c) The entirety of the operations of the product transfer and said weighings are effected under sealed conditions, insuring the impermeability of the circuit with respect to the product involved and the elements of the environment, in order to avoid the contamination of the workplace by leakage of the metered products in to the air, and, when operating at least two weighing assemblies (11) containing two different products, to avoid the mutual contamination of the products contained in the weighing assemblies. The conditions of impermeability under which the process is effected insure that the level of contamination of the environment in which a weighing assembly is installed, may not exceed 350 particles of the product or products treated, per liter of the ambient air, or 10,000 particles per cubic foot of the ambient air, in order to create the working conditions of a so-called white room.

(d) The said weights are determined with a precision of ±2.5% of the specified weights.

(e) The entirety of the operations is controlled by a computer program.

As mentioned hereinabove, the device and the process of the present invention satisfy more particularly the very strict requirements of an industry, such as the pharmaceutical industry. As an example, the use of the apparatus and process of the invention in the metering of a mixture from naturally powdery products, may be cited.

The apparatus and the process may be highly useful in manufacture on an industrial scale.

Thus, for example, they may be adapted so that:
the capacity of the stoppered feeder (8') effecting the preliminary storage of the product to be metered discharged from the container (1) is on the order of 2,000 to 2,500 liters.

and that the weighing assembly (11) is capable of delivering to the mobile receiver (16) loads of the metered product from 1 kg to 250 kgs.

The apparatus and the process may also be used to obtain mixtures of liquids or gases, or mixtures of powders and liquids, of liquids and gases, of liquified gas, of gas and powders, of powders, liquids and gas.

The metering process remains the same, only the means insuring the impermeability of the circuit with respect to the products being metered and the elements of the environment are chosen as functions of the nature of the products to be metered and mixed.

For this reason, the apparatus and the process of the invention may be used equally in particular in the cosmetic, perfume, in para-pharmaceutical, food, chemical and other industries.

By means of the apparatus and according to the process of the invention, metering is assured in accordance with any specifications of accuracy and under the impermeability conditions of the circuit required.

What I claim is:

1. In an apparatus for metering predetermined quantities of at least one product to be delivered to at least one mobile receiver, the apparatus comprising at least one automated distribution station forming a substantially environmentally impermeable transfer circuit with respect to the product to be transferred and wherein the improvement comprises:

I—means (3) effecting the discharge of a container (1) carrying a product to be metered, which comprises a vibrator or a pneumatic apparatus (3') capable of applying pressure to and cooperating with a potentially deformable wall of the container (1), equipped with a discharge conduit (4) connected to II—a device (8) insuring the preliminary storage, homogenization and transfer of the product to be metered to a weighing assembly (11), comprising a stoppered feeder (8'), equipped with means (9) to homogenize and transfer the product by an extractor in the form of an endless screw to III—a weighing assembly (11) comprising:
(a) metering feeder (12) equipped with a metering extractor (13) in the form of an endless screw situated to deliver the metered product to a mobile receiver (16);
(b) means for static and dynamic weighing of the metered product, and said assembly (III) is equipped with means to assure the transportation of the metered product into the mobile receiver (16).

2. An apparatus according to claim 1, wherein the discharge conduit (4) is tightly connected at one end thereof to the outlet of container (1) and at the other end, to the inlet of stopper feeder (8') which effects preliminary storage, said conduit (4) also containing a separating valve (5) between said ends.

3. An apparatus according to one of claims 1 or 2, wherein:
the discharge conduit (4) is equipped with a device (6) capable of creating a vacuum, thereby producing an aspiration effect in said conduit (4) and a blower device (7) to clean said conduit (4) of the particles of the product to be metered.

4. An apparatus according to claim 3, wherein the metering extractor (13) of metering feeder (12) is in the form of an endless screw which is controlled automatically by a computer which is responsive to weights detected by the weighing means (14).

5. An apparatus according to one of claims 1 or 2, wherein
means to transfer the product to the mobile receiver (16) and to obturate the outlet of the weighing assembly (11) comprises a tight joining device (15), connecting said weighing assembly (11) and said mobile receiver (16) and equipped with two butterfly valves (17) and (17') and further connected with an aspiration device (18) and a blower device (19), said joining device further being capable of being connected with the opening of the mobile receiver (16).

6. A process for metering a predetermined amount of a product into a mobile receiver which comprises discharging bulk product into a preliminary storage device (8) from which it is transfered to a weighing assembly (11) in the following manner:
   (1) the product is introduced into the weighing assembly until a first weighing, designated dynamic (I), indicates that the desired quantity of the product has been introduced into the weighing assembly (11) with the dynamic weight (I) then deactivating the introduction of the product via a programmed computer;
   (2) the quantity of the product present in the weighing assembly (11) is determined by means of a second weighing, designated static (II);
   (3) the product is caused to leave the weighing assembly (11) after opening a butterfly valve (17) of an inlet of a joining device (15), until a third weighing, designated dynamic (III), indicates that the desired quantity of the product has left the weighing assembly (11), whereupon the dynamic weight (III) causes the cessation of the delivery of the product via a programmed computer, the joining device (15) is cleaned and the butterfly valve (17') of the outlet of the joining device (15) is closed; and
   (4) a fourth weighing, designated static (IV), is performed which determines the quantity of the product still contained in the weighing assembly (11);
   (5) determining that the desired quantity of the product has been extracted from the weighing assembly (11), for transport to the mobile receiver (16), by comparing the values of the two static weights, i.e. the second static weight (II) and the fourth static weight (IV) in the computer; and
   (6) if the metered amount is less than the predetermined amount, then additional product is dispensed via the computer which causes the weighing assembly (11) to deliver to the mobile receiver (16) the quantity of product which represents the difference in the amount of product desired and the amount of product originally dispensed;
the entirety of the operations of the transfer of the metered product and the weighings being effected under conditions insuring the impermeability of the circuit with respect to the metered product annd the elements of the environment.

7. A metering process, by means of at least one weighing assembly (11), for dispensing predetermined quantities of at least one product to be delivered to at least one mobile receiver (16), which comprises:
   (a) introducing a product into a weighing assembly (11) until a first weight, designated dynamic weight (I), indicates that the desired quantity of the product has been introduced in said weighing assembly (11), with said dynamic weight (I) then causing, via a computer, the cessation of the further introduction of the product;
   (b) the quantity of the product present in the weighing assembly (11) is determined by means of a second weighing, designated static (II);
   (c) the product is caused to leave the weighing assembly (11), after opening a butterfly valve (17) of the inlet of a joining device (15) until a third weight designated dynamic (III) indicates that the desired quantity has left said weighing assembly (11), wherepon said dynamic weight (III) causes, via a computer, the cessation of the delivery of the product, and a fourth weighing, designated static (IV) is effected on the quantity of the product remaining in the weighing assembly (11);
   (d) the joining device (15) is cleaned and the butterfly valve (17') of the outlet of the joining device (15) closed;
   (e) determining via the computer that the desired quantity of the product has been extracted from the weighing assembly (11), to be transported to the mobile receiver (16), by comparing the values of the two static weights, i.e. the second static (II) and the fourth static (IV);
   (f) if the extracted amount is less than the predetermined quantity, the predetermined quantity is achieved by causing, via the computer, the weighing assembly (11) to deliver to the mobile receiver (16) that quantity of the product required to equal the quantity of the product specified initially; and
   (g) the operations of the transfer of the product to be metered to the weighing assembly (11), the weighing and the transfer of said product to the mobile receiver (16) are effected under conditions insuring the impermeability of the circuit with respect to the product involved and the elements of the environment.

8. A process according to one of claims 6 or 7, wherein the conditions of impermeability insure that a level of contamination not exceeding 350 particles of the product or products treated, per liter of ambient air or approximately 10,000 particles per cubic foot of the ambient air, in order to create white room working conditions.

* * * * *